Patented Aug. 18, 1942

UNITED STATES PATENT OFFICE 2,293,494

2,293,494

PROCESS FOR MAKING CERTAIN AMINO ETHERS AND VARIOUS ACYLATED DERIVATIVES THEREOF

Melvin De Groote, University City, and Bernhard Keiser, Webster Groves, Mo., assignors, by mesne assignments, to Petrolite Corporation, Ltd., a corporation of Delaware No Drawing. Application May 12, 1939, Serial No. 273,278

10 Claims. (Cl. 260—584)

This invention relates primarily to a new process for manufacturing certain amino ethers of the kind hereinafter described. In some instances said process is applicable to the manufacture of acylated derivatives of such amino ethers.

One object of our invention is to provide a novel process for the manufacture of such amino ethers, whereby one can predetermine to a greater degree than heretofore, the particular type of amino ether which will be obtained under selected conditions.

Another object is to provide a process by which such amino ethers can be obtained in greater yields than has been possible by other well known methods heretofore employed.

And still another object of our invention is to obtain such amino ethers in a state of technical purity, which is characterized by substantial freedom from various by-products which ordinarily occur as a result of unpreventable side reactions when the conventional processes of manufacture are employed.

As is well known, alcoholates are derivatives of alcohols, in which the hydroxyl hydrogen atom is replaced by a metal, particularly an alkali metal such as sodium or potassium. Alcoholates are also derivable from hydroxylated amines by replacing the analogous hydrogen atom. Briefly stated, we have found that if a finely-divided solid or undissolved alcoholate derived from a tertiary amine, such as triethanolamine, is treated with a halohydrin, such as glycerol chlorhydrin, glycerol bromhydrin, glycerol dichlorhydrin, or glycerol dibromhydrin, one can obtain a substantial yield of various aminoethers. Incidentally, it is also possible, under certain conditions hereinafter specified, that a soluble alcoholate in concentrated solution of sufficient strength might be employed instead of the finely-divided solid alcoholate or the undissolved alcoholate. Some of these amino-ethers have been produced heretofore by other methods, which will be briefly described subsequently; whereas, other amino-ethers possibly have not been produced heretofore, due to the fact that the usual methods of manufacture are unsuitable for their production. This may also be true in respect to certain acylated derivatives of such amino-ethers.

Our procedure comprises two essential steps. The first step is to convert the selected tertiary amine or acylated derivative thereof into a suitable alcoholate by any suitable means, such as the action of an alkali metal, such as sodium or potassium, or preferably, by means of concentrated aqueous alkali. The second essential step is to treat such alcoholate with a selected halohydrin or acylated halohydrin, and particularly a chlorhydrin, under such conditions that the alkali halide or alkali chloride formed will be insoluble and precipitated in substantially stoichiometrical proportions. Due to the lesser expense of using concentrated (preferably saturated) aqueous caustic alkali, as well as its universal availability and greater freedom from various hazards, we will largely limit our subsequent description to the manufacture of the alcoholate from concentrated alkali solution. It is understood that the alcoholate might be manufactured, at least in some instances, from the alkali metal itself in the conventional manner employed to produce alcoholates from primary alcohols. Needless to say, such reactions involving alkali metals or any metal, must be conducted with great caution. The compound selected for treatment must be such that no hydrogen atom other than the alcoholic hydrogen atom can be replaced by a metallic atom. Such procedure for producing alcoholates may be particularly advantageous when it is desirable to produce an alcoholate of an acylated hydroxy amine. It is well known that hydroxy amines such as triethanolamine may be treated with an acylating agent, i. e., a compound containing the acyl radical R.CO, such as R.COOH, R.COOCl, R.CONH₂, R.COOOR, etc., in which R may vary from a methyl radical, in the case of acetic acid to high hydrocarbon radicals in the case of butyric, heptoic, oleic, stearic, naphthenic, abietic, acids and the like. It may include acids having 32 carbon atoms. Fractional salts or esters of polybasic acids, such as ethyl monophthalate, may be considered as a monobasic acid. Benzoic acid and other similar cyclic acids may be employed.

Thus, compounds of the type:

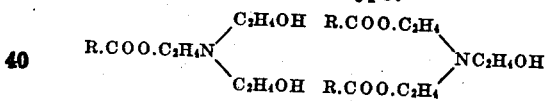

may be converted into the alcoholate with an alkali metal, but they could not be so converted by means of strong caustic alkali, because one would saponify or decompose the acylated compound thus:

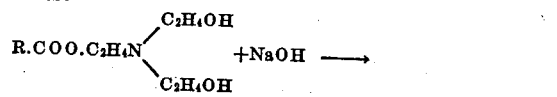

Alcoholates can be derived from divalent metals, such as calcium or magnesium, and even aluminum. Such alcoholates may be employed in the manner hereinafter described. Under such circumstances it would be necessary that the metallic chloride be insoluble, as is usually the case in respect to the alkali chloride.

When a tertiary hydroxy amine, particularly a basic amine, such as triethanolamine, is treated with dilute alkali, it is possible that an insignificant amount of an alcoholate is formed, but we do not know that this is the case. Obviously, subsequent evaporation and concentration of the solution cannot be employed to isolate such alcoholate, because the step of concentration itself would involve increasing the strength of the alkali solution, and thus cause the formation of the alcoholate to take place during such concentration. Similarly, if triethanolamine is treated with an alkali solution of medium strength, it may be that an appreciable amount of an alcoholate is formed; but in this instance again, one cannot be certain of this fact, unless the alcoholate precipitates and can be visually observed. Even if an alkali solution of medium strength did convert triethanolamine or a similar amine into an alcoholate in substantial amounts, such solution would not necessarily be satisfactory, because the question that then arises is whether or not in such specific concentration, subsequent reaction with the selected chlorhydrin or acylated chlorhydrin would result in the copious precipitation of sodium, potassium, or some other metallic halide or chloride. In other words, even if the solution of the alcoholate were fairly concentrated, it would not necessarily be suitable, unless upon adding the halohydrin to such solution, one did produce a copious precipitate, equivalent to the bulk of the alkali or metallic chloride, based on stoichiometrical proportions.

In view of what has been said previously, subsequent treatment will be concerned largely with the use of alkali metal or caustic solution. It has already been pointed out that under certain conditions calcium, magnesium, or other metals might be equally satisfactory. It is also possible that under certain conditions the hydrates of such metals, for instance, calcium oxide, might produce the alcoholates; and in such an event, particularly when unacylated amines are employed, an alcoholate, so produced, would be employed satisfactorily. Oxides of sodium or potassium might be used.

One must use the same amount of alkali, whether concentrated or diluted, and in all likelihood may use less alkali if concentrated, when attempting to obtain the polyalcoholates. In view of this fact, there appears no good reason why one should not use the most concentrated alkali solution available, i. e., saturated aqueous caustic soda or saturated aqueous caustic potash, in manufacturing the amino ethers herein described. In other words, if such saturated aqueous solution of a caustic alkali is added to triethanolamine, for example, in stoichiometrical proportion, one obtains a mono-alcoholate, which may be indicated by the following composition:

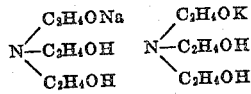

It is to be noted that under such conditions certain definite results can be clearly appraised. In the first place, the alcoholate is definitely formed, because it is precipitated. However, in a concentrated solution where the precipitate of the alcoholate does not appear, one could not be certain that the alcoholate had been obtained, as distinguished from a solution of the amine in caustic alkali solution. Thus, it is extremely convenient and expedient to conduct the reaction so that the solid alcoholate appears.

In the second place, if desired, the alcoholate can be removed by filtration, or by a hydraulic press, or by a centrifuge, and one can readily determine the yield based on the amount of amine originally employed.

Thirdly, one can also calculate and determine the amount of excess alkali represented by the liquid phase of the precipitated or pasty mass. From this value one can determine the wastage of the chlorhydrin which will subsequently take place if the excess of alkali is not removed. Finally, under the above conditions, there is present the minimum amount of water possible, and therefore, the amount of alcoholate lost by solution is produced to a minimum.

The alcoholates are water-soluble. The water solubility decreases with an increase in the hydrocarbon chain; for instance, trihexanolamine alcoholate may be less water-soluble than the one derived from triethanolamine. However, as previously stated, as far as the mechanism of our process is concerned, it could be employed effectively on a concentrated solution of the alcoholate, provided, of course, that one knew that the solution represented an alcoholate, as differentiated from a solution of the amine in caustic alkali, and provided that the concentration was sufficient that subsequent reaction with the chlorhydrin would result in the copious precipitation of the alkali chloride in stoichiometrical or approximately stoichiometrical amounts. Naturally, if the alcoholate were present in relatively concentrated solution, even so, if the subsequent reaction with the selected chlorhydrin did not precipitate salt or precipitated only relatively little salt, then under such conditions our process would not be applicable.

Having prepared such a product, i. e., a dry or undissolved alcoholate, or a water-soluble alcoholate, which is insoluble in its saturated solution (such saturated solution containing possibly some uncombined alkali and some uncombined amine), we then react such product with the selected chlorhydrin in an extremely cautious manner. The chlorhydrin, such as ethylene chlorhydrin, ethylene bromhydrin, or glycerin chlorhydrin, or the like, is permitted to react under carefully controlled conditions, preferably by adding the alcoholate in rather small quantities and at a rather slow rate, to the liquid or liquefied chlorhydrin with constant stirring, and constantly cooling the mixture during the course of reaction. It is extremely important that one should guard against mixing the total masses of the two reactants at one time, because the reaction might proceed spontaneously with explosive violence. Similarly, one should guard against mixing the two reactants in small quantities under conditions of lowered temperature, so that the reaction cannot take place at all. Under these last mentioned circumstances, possibly no reaction would take place until the temperature increased, and then would take place spontaneously through the entire mass.

The best procedure is to add a small amount of the alcoholate to the chlorhydrin, and note that the reaction is proceeding by the heat involved. One then should employ a suitable cooling means to keep the temperature within a suitable range while more alcoholate is added. At the end of the reaction, when heat is no longer being evolved, it may even be desirable at times to apply a little extraneous heat to insure completion of the reaction.

It is again desired to emphasize the fact that the reaction must be conducted with extreme care and conducted in such a manner that the reaction takes place smoothly, rather than permitting a dangerous reaction of explosive violence to take place, in the event that the entire mass combines spontaneously. One explanation of the possible reason for the danger is that if water is present, as is often the case, in fact usually the case, it is possible that such water is converted into steam spontaneously, and thus produces the result noted. In such instances where the dry alcoholate is employed, or where it is converted into a paste in the presence of an inert non-volatile solvent, there is little or no danger of a reaction of explosive violence. In some instances it is desirable to add an inorganic salt, such as sodium chloride, in small amounts, to the reaction mass to obtain an increased yield. The presence of such added inorganic salts will tend to dampen the velocity of reaction.

Obviously, raw materials of the kind above described can react so as to produce materials of the following composition:

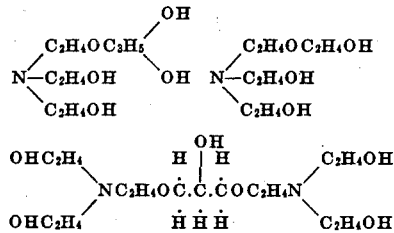

However, one can produce a dialcoholate in suitable form for subsequent reaction with substantially the same ease and by the same method as that employed in obtaining the mono-alcoholate. It is necessary to use more than the stoichiometrical amount of caustic alkali solution, and preferably to remove the excess of alkali by means of a centrifuge or by use of some suitable vehicle. Naturally, the dialcoholate could combine with glycerol monochlorhydrin or glycerol dichlorhydrin or similar materials to produce compounds of the following type:

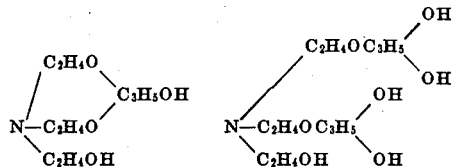

We have found in some instances that in employing a large excess of saturated solution of alkali, at least some small amounts of the tri-alcoholate are formed. The tri-alcoholate would permit the formation of the following type of materials:

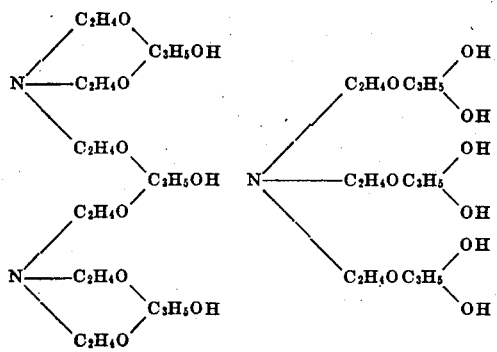

Various other materials immediately suggest themselves as suitable reactants for the herein described process. As far as we have been able to determine, it is only necessary that the selected amine be tertiary and that it produce an insoluble alcoholate by admixture with saturated caustic potash or saturated caustic soda, either added in stoichiometrical quantity or in excess. Generally speaking, when the mono-alcoholate is formed by addition of just the stoichiometrical quantity of alcohol, we prefer to employ the pasty or semi-solid mass so produced. If desired, such pasty or semi-solid mass can be treated in such a manner as to eliminate as much of the extraneous liquid phase as possible, as, for instance, subjecting same to hydraulic pressure or to a centrifuge.

It is necessary to remove any significant excess of alkali by any suitable means, in order to prevent wastage of the chlorhydrin. In the reactions above described involving an alcoholate, for instance, the monosodium alcoholate of triethanol amine and glycerol chlorhydrin, we have found that the reaction acts like a typical reaction of inorganic chemistry involving electrovalencies, rather than a typical organic reaction involving covalencies. Needless to say, the mass resulting from the reaction may be employed as such if there is no objection to the presence of sodium chloride or potassium chloride; or else, it can be freed from such inorganic salt in the usual manner by filtration, or by dilution with absolute alcohol or the like, followed by filtration, and evaporation of the diluent.

We again wish to emphasize the fact that the procedure here described could be applied to a concentrated solution of the alcoholate, provided that, as previously stated, one could be certain that such solution represented an alcoholate and not a consolute mixture of amine and aqueous caustic alkali; and provided that subsequent reaction with the selected chlorhydrin yielded the alkali chloride in at least approximately stoichiometrical proportions. In essense this means that although we prefer to employ a saturated alkali solution, it would be possible to use a solution whose concentration at ordinary temperature, for instance, 20° C., would be less than concentrated. Under such circumstances, even if one obtained complete conversion into the alcoholate, still more alcoholate would be apt to be lost as a result of the fact that more water would be present, which would require saturation. In some instances this effect might be offset by the addition of an inorganic salt, such as sodium, or potassium chloride.

It has been previously pointed out that one may obtain acylated derivatives of the amino ethers by use of the acylated alcoholate derived by utilization of metallic sodium or potassium or the like. In such compounds the acyl radical is attached directly to the tertiary amine residue or radical. However, if one employs an esterified chlorhydrin, i. e., the chlorhydrin derived from monoacetin, monostearin, monoabietin, mononaphthenin, or the like, one obtains a chlorhydrin of the following composition:

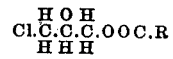

in which R.CO is the acyl radical derived from R.COOH, which represents an acid of the kind previously described. By employing such acylated halohydrin or chlorhydrin, one can use reactants which include reactions of the following composition:

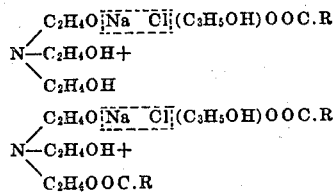

The above reactions can only be conducted in the absence of free alkali.

As has been previously suggested, as far as we are aware, the above described procedure may be applied with equal effectiveness to materials such as the ether type amines, sometimes referred to as polyethanolamines, as indicated by the following formula:

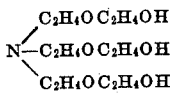

or to the higher alkanolamines, such as tripropanolamine, tributanolamine; tertiary amines, such as ethyl diethanolamine, cyclohexyl diethanolamine, benzyl diethanolamine; a glycerylamine, such as triglycerylamine, amyl diglycerylamine; tertiary amines containing cyclohexylol groups, and the like. We again desire to point out, the only prerequisite, as far as we have been able to determine, as far as using our method in its preferred adaptation is concerned, is that the hydroxy amine shall be tertiary and that it will combine with concentrated alkali, i. e., saturated aqueous caustic soda or saturated aqueous caustic potash, to produce an insoluble alcoholate, i. e., an alcoholate that is insoluble in the concentrated solution produced by reaction in stoichiometrical ratios, or by use of saturated alkali solution in excess. Our preference is to employ the process in connection with a tertiary amine containing three hydroxyalkyl radicals, such as triethanolamine, tripropanolamine, tributanolamine, and the like. Alkanol morpholines can be used.

It will be noted that the amines above referred to are characterized by being non-aryl in character. In other words, there is no aryl radical, such as a phenyl radical, or a naphthyl radical, attached to the amino nitrogen atom, as is the case in phenyl diethanolamine. Our preference is to use a non-aryl amine of the kind previously described. Such nonarylamines are basic in character, i. e., their basicity approaches that of triethanolamine or the like. They may be somewhat more basic or somewhat less basic; but in any event, they are more basic than aniline, for example, and produce relatively stable salts of the ordinary inorganic acids. On the other hand, if a tertiary hydroxylated amine containing an aryl radical, as, for example, phenyl diethanolamine, is treated in a manner to yield an alcoholate; for instance, one might employ the alkali metal, as previously noted. Such alcoholate can be used advantageously in the procedure herein described.

References to chlorhydrin are intended to mean compounds of the type of ethylene chlorhydrin, glycerol chlorhydrin, glycerol dichlorhydrin, or similar chlorhydrins obtained from polyglycols, such as a comparable chlorhydrin derived from diethylene glycol, instead of ethylene glycol, or from the polymethylene glycols, or from diglycerol or the like. All of such chlorhydrins are characterized by having at least one hydroxyl radical and at least one labile chlorine atom. They include a carbon atom chain or a carbon atom chain interrupted at least once by an oxygen atom or the like. As previously stated, some other halohydrin, such as a bromhydrin, might be employed to equal advantage, except for its increased cost.

The amino ethers of the kind described or their obvious variants, including higher polymeric forms, are applicable in the arts to the same purposes for which various amines and various polyhydric alcohols have been employed. For instance, in such instances where they contain at least two hydroxyl radicals, they may be employed in the manufacture of resinous or semi-resinous materials in the same manner that ethylene glycol, glycerol, diethanolamine, or triethanolamine are employed. They may be employed as intermediates in acylation reactions or similar reactions. They may be used in the manufacture of salts or soaps.

It may be well to indicate some of the advantages the procedure hereto employed has, compared with other comparable procedures, which have been previously utilized in the art. One method previously employed to produce material of this kind has been to heat any suitable mixtures, such as a mixture of glycerol and triethanolamine. The obvious objection to such procedure, among others, is that one produces an appreciable amount of polyglycerols, possibly some ethanol morpholine, and relatively smaller amounts of material of the type characterized by having both a glycerol residue and a triethanolamine residue present in the same molecule.

Another procedure which has been employed depends on the treatment of triethanolamine with ethylene oxide, glycidol, or the like. The objection to such procedure is that it was impossible to adequately control the reaction, so as to limit the reaction, if desired, to a single $C_2H_4OH$ radical attached to the amino nitrogen atom in the case of triethanolamine; but the reaction tends to result in a conglomerate mixture of cogeners which includes a number of obvious variants.

Another procedure which has been employed is to treat a material such as triethanolamine (not the alcoholate) with glycerol chlorhydrin. The objection to this procedure is that the reaction goes rather slowly, and that hydrochloric acid is formed which combines with the amine so that the finished product in any instance is an amine hydrochloride, which then must be subjected to treatment with strong caustic to produce the base; and the base, after being liberated by action with strong caustic, usually requires dehydration for many subsequent purposes. Furthermore, an entirely different, or at least somewhat different, type of compound may be obtained.

It is further believed that the method or process herein described for manufacturing amino ethers, is adaptable to the production of certain amino ethers not heretofore produced by previously known methods. The reason is that one can control reactions by selecting the proper alcoholate and the proper chlorhydrin so as to obtain a specific type. This is especially true in regard to certain acylated derivatives, all of which have been previously described.

Depending on the purpose intended, one need not employ a single alcoholate, but one might employ a mixture of the mono- and dialcoholate;

or one might employ some mixture of alcoholates derived from a mixture of tertiary alkanolamines, for instance, a mixture of triethanolamine and tripropanolamine. It is obvious that the reactions are conducted in the desired molecular ratio, depending on the molecular weight of the reactants and the composition of the final product desired. We have employed the process with marked satisfaction in a manner comparable to the following:

100 pounds of commercial triethanolamine containing 2½% monoethanolamine and 15% diethanolamine, are treated with 133 pounds of a 60% solution of caustic soda (i. e., 80½ lbs. NaOH dissolved in 53 lbs. of water), so as to yield a pasty or semi-solid mass containing substantially no free or relatively little free alkali. The wet mass is then reacted with extreme care, as previously noted, with commercial glycerol monochlorhydrin. After completion of reaction, the sodium chloride formed is separated by filtration and hydraulic pressure. The final product represents a compound of technical purity and has the following composition:

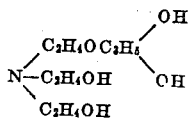

In the hereto appended claims no reference is made to the fact that the alcoholate is employed in substantial absence of alkali, because it is deemed unnecessary to indicate that this condition is the most desirable. The objection to an excess of alkali is the destruction of the chlorhydrin and the formation of a polyhydric alcohol or the like, which appears in the completed product. Naturally, there is no objection to small amounts of excess alkali whose significance is not appreciable. It is to be noted in the claims that no reference is made to separation of the alcoholate from water, excess alkali, unreacted amine, etc., which may be present, although as previously indicated, such separatory procedure may be followed if desired. Indeed, an inert liquid vehicle may be present to give a pasty mass which is more easily handled. Furthermore, there is no reference in the appended claims to separation of the final product from the inorganic salt, sodium chloride, potassium chloride, or the like, which is formed. Needless to say, if subsequent utilization demands separation from such inorganic salt, it is obvious how to eliminate such salt.

In the hereto appended claims the expression "amino-ether" is used in the generic sense to include acylated forms. When reference is intended to be to the sub-genus or species without an acyl radical present, reference will be made to the non-acylated form. Obviously, when the expression "amino-ether" is used broadly in such claims to include the acylated derivative, then it is understood that reference to the amine from which the alcoholate is derived and reference to the halohydrin from which the ether is derived is intended to include the acylated forms in both instances. Under such circumstances, obviously either the amine or the chlorhydrin, or both, must or can be acylated. In such claims where the scope is limited to unacylated forms, obviously both the amine and the halohydrin must be free from acylated radicals.

In the hereto appended claims the expression "aliphatic" is intended to include cycloaliphatic (alicyclic) types.

Having thus described our invention, what we claim as new and desire to secure by Letters Patent is:

1. In a process for producing an amino ether, the step of metathetically reacting a halohydrin with the alcoholate of a metal selected from the class consisting of sodium, potassium, calcium, magnesium and aluminum and derived from a tertiary hydroxy amine of the formula type:

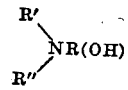

in which R is a saturated aliphatic group, R' and R'' are saturated aliphatic groups R, R' and R'' being linked to the nitrogen through a carbon atom; said reaction being conducted so as to produce a copious precipitate of the metal halide.

2. In a process for producing an amino ether, the step of metathetically reacting a halohydrin with an alkali metal alcoholate derived from a tertiary hydroxy amine of the formula type:

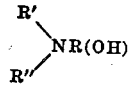

in which R is a saturated aliphatic group, R' and R'' are saturated aliphatic groups R, R' and R'' being linked to the nitrogen through a carbon atom; said reaction being conducted so as to produce a copious precipitate of the metal halide.

3. The process of producing amino ethers which comprises reacting an alkali metal alcoholate of a tertiary amine of the formula type:

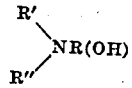

in which R, R' and R'' are saturated aliphatic groups linked to the nitrogen through a carbon atom with a chlorhydrin, said reaction with the chlorhydrin being conducted so as to produce a copious precipitate of the metal chloride.

4. The process of producing amino ethers which comprises reacting an alkali metal alcoholate of a tertiary amine of the formula type:

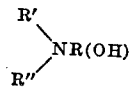

in which R is a saturated aliphatic hydrocarbon group and R' and R'' are hydroxy alkyl groups with a chlorhydrin, said reaction with the chlorhydrin being conducted so as to produce a copious precipitate of the metal chloride.

5. The process for producing amino ethers which comprises metathetically reacting an alkali metal alcoholate of triethanolamine with a chlorhydrin, said metathetical reaction being conducted so as to produce a copious precipitate of the metal chloride.

6. The process for producing amino ethers which comprising metathetically reacting an alkali metal alcoholate of triethanolamine with a glycerol chlorhydrin, said metathetical reaction being conducted so as to produce a copious precipitate of the metal chloride.

7. The process for producing amino ethers which comprises metathetically reacting an alkali metal mono-alcoholate of triethanolamine with a glycerol mono-chlorhydrin, said metathetical reaction being conducted so as to give a copious precipitate of the metal chloride.

8. The process for producing amino ethers which comprises metathetically reacting an alkali metal di-alcoholate of triethanolamine with a glycerol mono-chlorhydrin, said metathetical reaction being conducted so as to give a copious precipitate of the metal chloride.

9. In a process for producing an amino ether, the step of metathetically reacting a halohydrin with the alcoholate of a metal selected from the class consisting of sodium, potassium, calcium, magnesium and aluminum and derived from a tertiary hydroxy amine, said amine being selected from the group consisting of compounds of the formula type:

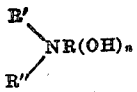

in which $n$ is an integer not greater than two, R is a saturated aliphatic group, R' and R'' are members of the class consisting of saturated aliphatic, aralkyl, and aryl groups and aliphatic groups in which R' and R'' together form an oxygen interrupted ring structure and acylated derivatives thereof in which R' and R'' are substituted by not more than two acyl-oxy groups corresponding to a carboxylic acid; R, R' and R'' being linked to the nitrogen through a carbon atom; said reaction being conducted so as to produce a copious precipitate of the metal halide.

10. In a process for producing an amino ether, the step of metathetically reacting a halohydrin with the alcoholate of a metal selected from the class consisting of sodium, potassium, calcium, magnesium and aluminum and derived from a tertiary hydroxy amine, said amine being selected from the group consisting of compounds of the formula type:

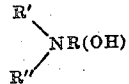

in which R is a saturated aliphatic group, R' and R'' are members of the class consisting of saturated aliphatic, aralkyl and aryl groups and aliphatic groups in which R' and R'' together form an oxygen interrupted ring structure and acylated derivatives thereof in which R' and R'' are substituted by not more than two acyl-oxy groups corresponding to a carboxylic acid; R, R' and R'' being linked to the nitrogen through a carbon atom; said reaction being conducted so as to produce a copious precipitate of the metal halide.

MELVIN DE GROOTE.
BERNHARD KEISER.